(12) United States Patent
Rambur

(10) Patent No.: US 10,222,827 B1
(45) Date of Patent: Mar. 5, 2019

(54) ELECTRONIC DEVICE MOUNTING APPARATUS FOR A MOTORCYCLE

(71) Applicant: Abraham Rambur, Huntington Beach, CA (US)

(72) Inventor: Abraham Rambur, Huntington Beach, CA (US)

(*) Notice: Subject to any disclaimer, the term of this patent is extended or adjusted under 35 U.S.C. 154(b) by 74 days.

(21) Appl. No.: 15/619,783

(22) Filed: Jun. 12, 2017

Related U.S. Application Data

(60) Provisional application No. 62/401,080, filed on Sep. 28, 2016.

(51) Int. Cl.
| | | |
|---|---|---|
| *B62J 11/00* | (2006.01) | |
| *B62K 19/40* | (2006.01) | |
| *G06F 1/16* | (2006.01) | |
| *B62K 11/14* | (2006.01) | |

(52) U.S. Cl.
CPC ............. *G06F 1/1607* (2013.01); *B62J 11/00* (2013.01); *B62K 19/40* (2013.01); *B62K 11/14* (2013.01)

(58) Field of Classification Search
CPC ....... B60K 37/04; B60R 11/02; G06F 1/1607; B62K 11/14; B62K 19/40; B62J 11/00
USPC ..................................... 248/310, 314, 224.7
See application file for complete search history.

(56) References Cited

U.S. PATENT DOCUMENTS

| | | | | |
|---|---|---|---|---|
| 4,019,774 A * | 4/1977 | Tsukahara | ............... | B62K 19/46 296/78.1 |
| 4,507,706 A * | 3/1985 | Trexler, Jr. | ............. | H02B 1/056 340/461 |
| 4,736,924 A * | 4/1988 | Bednar | .................. | G01D 11/30 248/27.1 |
| 5,001,779 A * | 3/1991 | Eggert | .................... | B60R 11/02 224/413 |
| 7,472,940 B2 * | 1/2009 | Sullivan | ................. | B60K 35/00 180/90 |
| 7,681,901 B2 * | 3/2010 | LaCour | .................... | B62J 99/00 280/279 |
| 8,550,410 B2 * | 10/2013 | Fraser | .................... | B60R 11/02 248/205.1 |
| 8,777,290 B1 * | 7/2014 | Boese | .................... | B60K 37/02 180/90 |
| 2002/0119708 A1 * | 8/2002 | Eisenbraun | ............ | H01R 24/58 439/668 |

* cited by examiner

*Primary Examiner* — Joseph M Rocca
*Assistant Examiner* — Daniel S Yeagley
(74) *Attorney, Agent, or Firm* — Plager Schack LLP

(57) ABSTRACT

A mounting apparatus disposed within an existing gauge slot in a motorcycle to secure an electronic device thereto is provided. The mounting apparatus is coupled to the gauge slot by a bracket and mechanical fasteners. The mounting apparatus includes a cylindrical base member having a front face and a rear face, the front face having a generally cylindrical cap coupled thereto, and a mounting member mechanically coupled to the base member and having an exposed portion extending out the front face. The exposed portion of the mounting member permits attachment of the electronic device thereon. The cylindrical base member is disposed within the bracket and coupled to an interior of the gauge slot by the mechanical fasteners, thereby permitting the electronic device to be mounted to the motorcycle.

5 Claims, 3 Drawing Sheets

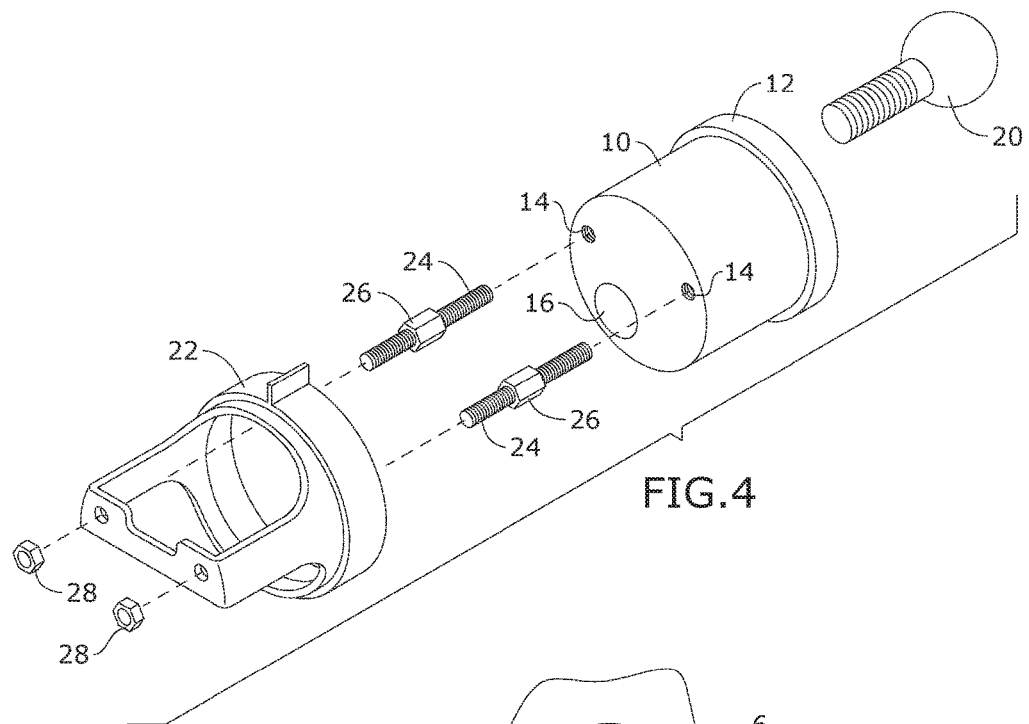
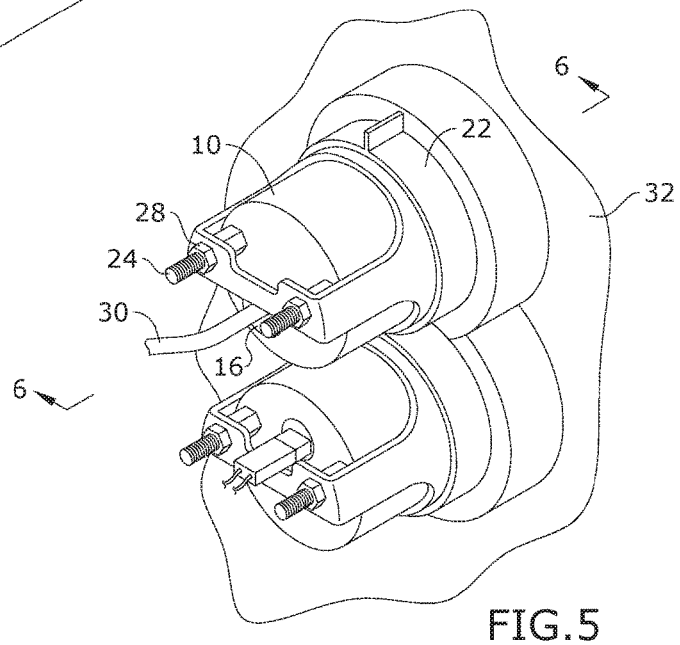

ELECTRONIC DEVICE MOUNTING APPARATUS FOR A MOTORCYCLE

RELATED APPLICATION

The application claims priority to provisional patent application U.S. Ser. No. 62/401,080 filed on Sep. 28, 2016, the entire contents of which is herein incorporated by reference.

BACKGROUND

The embodiments herein relate generally to electronic device mounting apparatuses for use with motorcycles. More specifically, embodiments of the invention are directed to an electronic device mounting apparatus for year 2008-2013 Harley-Davidson Road Glide models.

Motorcycle riders often use a variety of electronic devices on the road including, but not limited to, Global Positioning System ("GPS") devices, smartphones, music players, XM satellite radio receivers, and the like.

Current electronic device mounting devices for motorcycles have many limitations and/or disadvantages. In particular, several electronic device mounting devices obstruct the rider's field of vision. This is problematic and a safety hazard. Other mounting devices are undesirable because they block important motorcycle components and/or instrumentation, or are designed to mount to a surface on the motorcycle not designed to support weighted objects. Other mounting devices are mounted to the motorcycle's top handlebar. This creates an asymmetrical appearance and top heavy vehicle configuration, which can negatively affect the rider's driving dynamics. Other current mounting devices are not aesthetically pleasing and/or do not effectively mount the electronic device to the motorcycle in a manner that withstands environmental elements such as the wind and precipitation.

Motorcycles including the Harley-Davidson Road Glide include several gauge slots in the dashboard. These gauge slots are designed to secure instrumentation such as an ambient temperature gauge and fuel gauge. These instrumentation components can be easily detached and reattached to any of the gauge slots as desired by the rider. Many motorcycle riders do not find the information from the ambient temperature gauge as critical and simply remove the gauge from the motorcycle.

As such, there is a need in the industry for an electronic device mounting apparatus that addresses the limitations of the prior art, which is disposed within an existing gauge slot in the motorcycle's dashboard to secure the electronic device thereon.

SUMMARY

A mounting apparatus disposed within an existing gauge slot in a motorcycle to secure an electronic device thereto is provided. The mounting apparatus is coupled to the gauge slot by a bracket and mechanical fasteners. The mounting apparatus comprises a generally cylindrical base member comprising a front face and a rear face opposite the front face, the front face comprising a generally cylindrical cap coupled thereto, the cap comprising a first diameter that is greater than a second diameter of the cylindrical base member, and a mounting member mechanically coupled to the base member and comprising an exposed portion extending out the front face, the exposed portion of the mounting member configured to permit attachment of the electronic device thereon, wherein the cylindrical base member is configured to be disposed within the bracket and coupled to an interior of the gauge slot by the mechanical fasteners, thereby permitting the electronic device to be mounted to the motorcycle.

BRIEF DESCRIPTION OF THE FIGURES

The detailed description of some embodiments of the invention will be made below with reference to the accompanying figures, wherein the figures disclose one or more embodiments of the present invention.

FIG. 4 depicts an exploded view of certain embodiments of the mounting apparatus;

FIG. 5 depicts a rear perspective view of certain embodiments of the mounting apparatus shown mounted in dashboard 32.

DETAILED DESCRIPTION OF CERTAIN EMBODIMENTS

Figure 1:
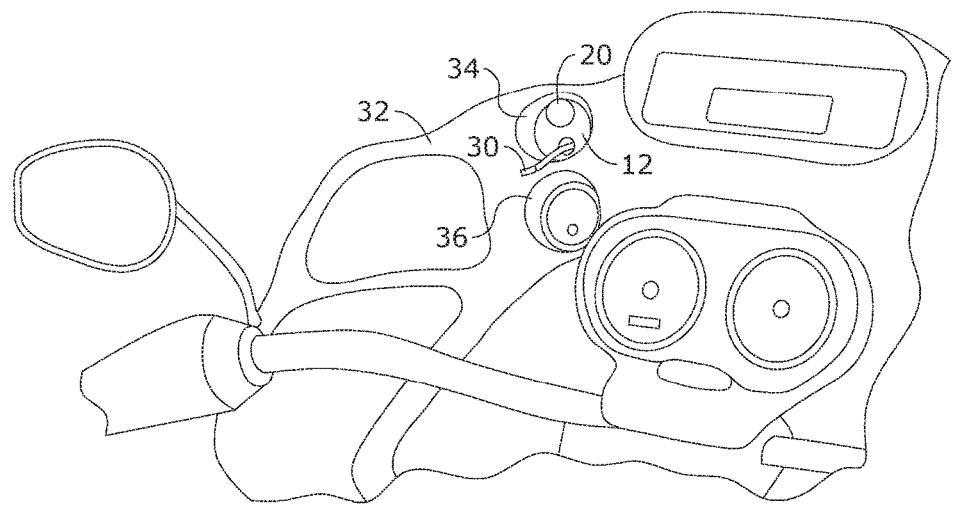
FIG. 1 depicts a perspective view of certain embodiments of the mounting apparatus shown in use.
Figure 2:
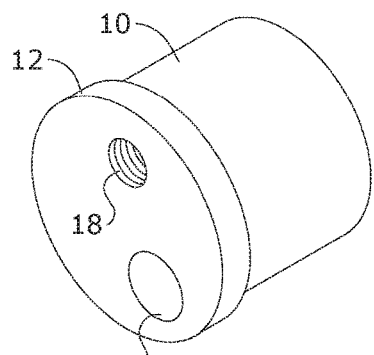
FIG. 2 depicts a front perspective view of certain embodiments of the mounting apparatus.
Figure 3:
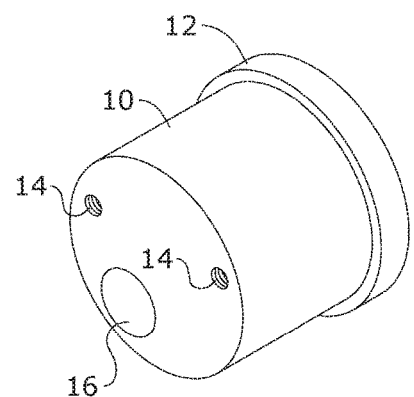
FIG. 3 depicts a rear perspective view of certain embodiments of the mounting apparatus.

As depicted in FIGS. 1-3, the mounting apparatus generally comprises body 10, cap 12 and mounting member 20, and is configured to be disposed within either upper gauge slot 34 or lower gauge slot 36 located in dashboard 32 of a motorcycle. In an exemplary embodiment, the existing upper gauge slot 34 and lower gauge slot 36 are configured to secure instrumentation therein including, but not limited to, an ambient temperature gauge or fuel gauge. Any instrumentation component can be detached from and/or attached to any one of the upper and lower gauge slots 34, 36 as desired. The mounting apparatus is configured to be disposed in any empty gauge slot, which can be either upper gauge slot 34 as depicted in FIG. 1 or lower gauge slot 36.

The electronic device (not shown) is attached to mounting member 20 and may include, but is not limited to, GPS navigation devices, smartphones, music players, XM satellite radio receivers, and the like. In a preferred embodiment, the motorcycle is a year 2008-2013 Harley-Davidson Road Glide model. However, it shall be appreciated that the mounting apparatus may be beneficial for use with other Harley-Davidson models, other motorcycles or vehicles.

As depicted in FIGS. 2-4, the mounting apparatus comprises cap 12 coupled to the front face of body 10. The mounting apparatus is preferably made from aluminum. However, other metals, plastics or other materials can be used instead. Body 10 comprises a cylindrical member having a diameter of approximately 1¾"-2". Cap 12 is a cylindrical member comprising a diameter of approximately 2"-2¼" and a length of approximately ¼"-½". In a preferred embodiment, cap 12 and body 10 are a single and continuous component with an approximate overall length of 1½"-2¼". However, cap 12 and body 10 may be separate components coupled together in alternative embodiments.

Figure 6:
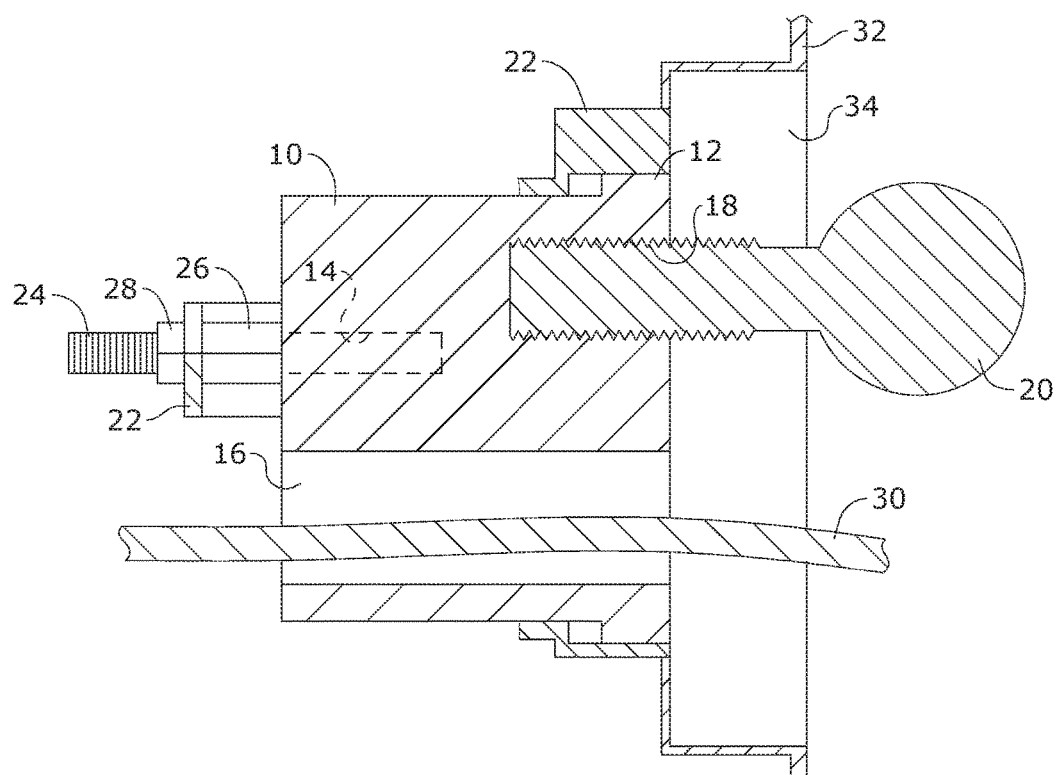
FIG. 6 depicts a section view of certain embodiments of the mounting apparatus taken along line 6-6 in FIG. 5.

As depicted in FIG. 6, the rear face of body 10 comprises a pair of rear fastening screws 14 disposed therethrough and partially extending through body 10. In one embodiment, the pair of rear fastening screws 14 are located proximate an edge of the rear face of body 10. Front threaded fastening hole 18 extends through cap 12 and the front face of body 10. Front threaded fastening hole 18 partially extends through body 10. Wiring hole 16 extends entirely through body 10 and cap 12, and is oriented generally parallel to a longitudinal axis of body 10.

In operation, the mounting apparatus is secured to one of the upper or lower gauge slots 34, 36 by using components such as mounting bracket 22, bracket screws 24, spacer nuts 26 and nuts 28 as depicted in FIGS. 4-6. Body 10 of the mounting apparatus is disposed within mounting bracket 22 and secured in place by bracket screws 24 and nuts 28. More specifically, the threaded pair of bracket screws 24 are disposed through mounting bracket 22 and the pair of rear threaded fastening holes 14 in body 10. Nuts 28 are disposed around ends of bracket screws 24 and tightened against mounting bracket 22. A pair of spacer nuts 26 are disposed around the pair of bracket screws 24 and are in contact with the rear face of body 10 and mounting bracket 22 in the tightened configuration. In one embodiment, a rubber gasket can be used to seal space between cap 12, body 10 and mounting bracket 22. This prevents moisture and fluid from the ambient environment from entering the gauge slot.

Mounting bracket 22 and the mounting apparatus are disposed within one of the upper or lower gauge slots 34, 36 in dashboard 32 of the motorcycle. As depicted in FIGS. 1 and 6, mounting member 20 is coupled to the mounting apparatus. Mounting member 20 comprises a threaded portion inserted within front threaded fastening hole 18 in the mounting apparatus and an approximately 1" diameter spherical ball mount that extends outside of upper gauge slot 34.

The electronic device (not shown) is coupled to the spherical ball mount of mounting member 20. This secures the electronic device to dashboard 32 of the motorcycle. Device wiring 30 from the motorcycle such as power and communication wires are passed through wiring hole 16 in the mounting apparatus. This permits device wiring 30 to be connected to the electronic device as needed. In one embodiment, one or more grommets are disposed around device wiring 30 to create a water seal within wiring hole 16 of the mounting apparatus. It shall be appreciated that cap 12 comprises a larger diameter than the diameter of body 10. This helps to create a seal within mounting bracket 22 and prevents moisture, fluid, dirt and debris from entering upper gauge slot 34 of the motorcycle.

It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting apparatus disposed within an existing gauge slot in a motorcycle to secure an electronic device thereto, the mounting apparatus coupled to the gauge slot by a bracket and mechanical fasteners, the mounting apparatus comprising:
    a generally cylindrical base member comprising a front face and a rear face opposite the front face, the front face comprising a generally cylindrical cap coupled thereto, the cap comprising a first diameter that is greater than a second diameter of the cylindrical base member;
    a first hole disposed entirely through the cylindrical base member and cap, and oriented generally parallel to a longitudinal axis of the base member, the first hole configured to permit wiring of the motorcycle to pass therethrough and be connected to the electronic device; and
    a mounting member mechanically coupled to the base member and comprising an exposed portion extending out the front face, the exposed portion of the mounting member configured to permit attachment of the electronic device thereon;
    wherein the cylindrical base member is configured to be disposed within the bracket and coupled to an interior of the gauge slot by the mechanical fasteners, thereby permitting the electronic device to be mounted to the motorcycle.

2. The mounting apparatus of claim 1, further comprising a pair of rear threaded fastening holes disposed through the rear face of the cylindrical base member and partially extending within the cylindrical base member, the pair of rear threaded fastening holes configured to receive the mechanical fasteners.

3. The mounting apparatus of claim 2, wherein the pair of rear threaded fastening holes are located proximate an edge of the rear face of the cylindrical base member.

4. The mounting apparatus of claim 3, further comprising a front threaded fastening hole disposed through the cap and front face of the cylindrical base member and partially extending within the cylindrical base member, the front threaded fastening hole configured to receive the mounting member.

5. The mounting apparatus of claim 4, wherein the exposed portion of the mounting member comprises a spherical shape.

* * * * *